United States Patent
Freismuth et al.

[15] 3,640,454
[45] Feb. 8, 1972

[54] FORWARD POPPET THERMOSTAT

[72] Inventors: John S. Freismuth, Arlington Heights, Ill.; Nello L. Benedetti, deceased, late of Mt. Prospect, Ill., by Lena Benedetti, Executor, Mount Prospect, Ill.

[73] Assignee: Eaton Yale & Towne Inc., by said Freismuth

[22] Filed: July 24, 1970

[21] Appl. No.: 58,007

[52] U.S. Cl. .................................................236/34
[51] Int. Cl. .................................................Folp 7/16
[58] Field of Search ......................236/34, 34.5, 93

[56] References Cited

UNITED STATES PATENTS

| | | | |
|---|---|---|---|
| 3,017,113 | 1/1962 | Drapeau | 236/34 |
| 3,315,890 | 4/1967 | Drapeau | 236/34 |
| 3,353,745 | 11/1967 | Beatenbough | 236/34 |
| 3,485,448 | 12/1969 | Coudriet | 236/34 |
| 3,558,046 | 1/1971 | Kelly | 236/34 |

Primary Examiner—Edward J. Michael
Attorney—Teagno & Toddy

[57] ABSTRACT

A thermostatic valve to be mounted in the coolant system of an internal combustion engine to control the flow of fluid through the system. A thermostatic valve of the forward poppet-type in which a single poppet cooperating with a single valve seating surface is independently responsive to both temperature and pressure for controlling the flow of fluid through said valve. The poppet is slidably engaged with the extending thermal element and spring biased into a seated or closed position. The poppet will unseat, or open, in response to an extension of the thermal element or, totally independently of the thermal element, will unseat in response to an upstream pressure sufficient to overcome the spring bias.

3 Claims, 3 Drawing Figures

INVENTORS.
JOHN S. FREISMUTH
NELLO L. BENEDETTI

BY
ATTORNEYS

INVENTORS.
JOHN S. FREISMUTH
NELLO L. BENEDETTI

ATTORNEYS 3,640,454

FORWARD POPPET THERMOSTAT

BACKGROUND OF THE INVENTION

This invention relates to improved thermostatic valves for internal combustion engine cooling systems, and more particularly to thermostatic valves of the single forward poppet type which will open, independent of any temperature rise, in response to a predetermined upstream pressure.

Heretofore, single poppet valves used to control the temperature of coolant in internal combustion engines were controlled by thermal elements which operated to open the poppet valves as the temperature of the coolant reached a predetermined value. The response of the valve to the excessive pressures generated by the water pump during fast startup of a cold engine, if any, was a result of the fluid pressure overpowering the thermal element and forcing the poppet into a forward or open position. Such overpowering of the thermal element is undesirable as it occurs at different pressure levels for different values of coolant temperature making a predictable pressure relief difficult or impossible. Such an overpowering may also have a damaging effect on the thermal element. Attempts to provide for an accurate pressure relief in a thermostatic valve of the type described have included the utilization of at least two separate valving ports, one thermostatically controlled and the other pressure controlled within the same thermostat. This approach is undesirable as its requires a more complicated and expensive valve structure.

A principal object of this invention, therefore, is to provide an improved thermostatic valve.

A further object of the invention is to provide an improved forward poppet valve in which a single poppet is independently responsive to both temperature and pressure.

A further object of the invention is to provide an improved thermostatic valve of the forward poppet type in which a single poppet cooperating with a single valve seating surface provides a pressure relief in addition to its thermal responsive function.

A further object of the invention is to provide an improved thermostatic valve of the single forward poppet type in which the poppet is spring biased into a closed position and is slidably engaged to the thermal unit and thus, by careful selection of the thermal unit and biasing spring, will open in response to either a predetermined temperature or a predetermined pressure.

SUMMARY OF THE INVENTION

This invention relates to an improved thermostatic valve of the forward poppet type for use in the coolant system of an internal combustion engine. The valve is independently responsive to both temperature and upstream pressure as will be explained below. The valve body is located in the coolant conduit and has a valve seat defining a flow port and a poppet valve for regulating the fluid flow therethrough. The poppet is spring biased to seat on the low pressure, or upstream side of the valve seat and cooperates with the seat to control the flow of fluid. A thermal element is mounted on the high pressure, or upstream side of the valve body and has a power member for thermally activating the poppet extending in a downstream direction therefrom. The power member is further extensible in the downstream direction in response to predetermined temperatures. The poppet is slidably engaged to the power member and will unseat from said valve seat in response to downstream extensions of said power member. At a predetermined upstream pressure sufficient to overcome the bias, the poppet will slidably disengage from the power member and move upstream to unseat totally independently of said power member, thus providing a single forward poppet valve independently responsive to both temperature and downstream pressure.

DETAILED DESCRIPTION OF THE INVENTION

Figure 1:
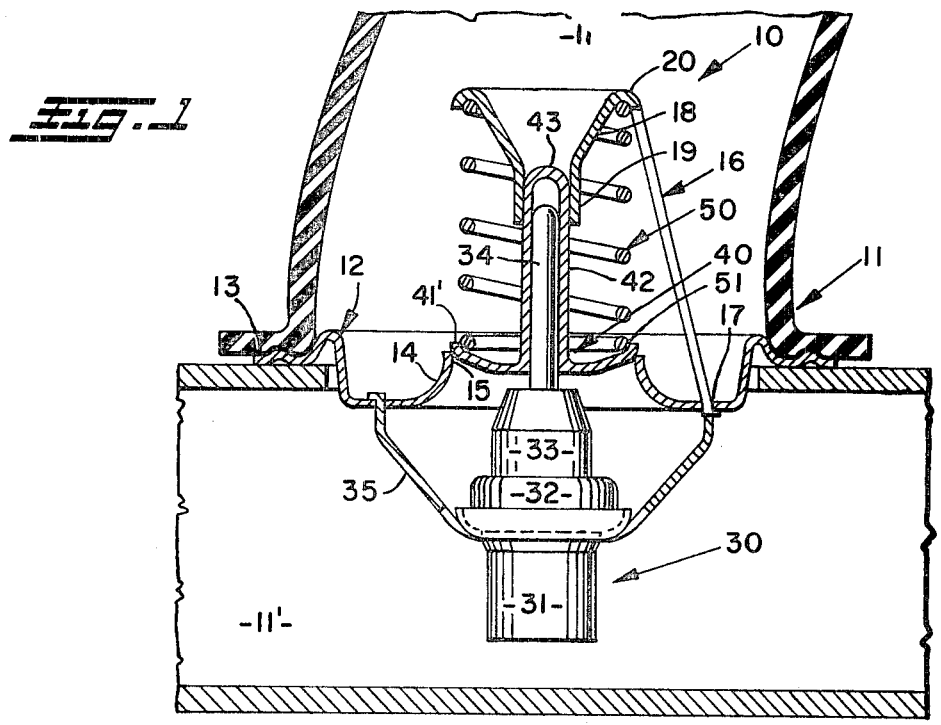
FIG. 1 is a sectional view of the thermostat of this invention within a cooling system.

FIG. 1 illustrates a thermostat 10 mounted in an internal combustion engine coolant conduit system shown generally at 11. The thermostat 10 is generally interposed between the upstream high pressure area 11' and the downstream low pressure area 11'' of coolant system 11. The thermostat 10 illustrated in the drawings comprises a generally transverse wallpiece 12 which has an annular flange 13 extending therefrom which provides a means for mounting the thermostat 10 in a desired location in the cooling system of an internal combustion engine or the like. The transverse wallpiece 12 also has an inwardly and upwardly extending portion 14 which is apertured as at 15 to define a valve seating surface and flow port for the flow of coolant through the thermostat.

A strut 16 extends upwardly from the transverse wallpiece 12 and is rigidly connected thereto at 17 by welding or the like. The strut 16 has an inwardly and downwardly extending portion 18 which is apertured as at 19 to form an annular guiding member. The uppermost portion 20 of strut 16 is concave in a generally downward direction whereat compression spring 50 engages the undersurface of strut portion 20.

The thermal element 30 is of the well-known "solid-filled" type and comprises a temperature sensitive portion 31, a collar 32, a power member guide portion 33, and a power member 34. The thermostat contains a fusible thermally expandable material within the temperature sensitive portion 31 which begins expanding when the ambient temperature rises to or above the critical temperature of the expandable material and continues to expand at a predetermined rate thereafter. The expandable material includes a diaphragm within the power unit which in turn abuts or is connected to the power member 34 so that the heating of the temperature sensitive portion 31 above the critical temperature the expandable material contained therein will affect relative extensible movement of the power member 34 from the casing of the power unit. For the purposes of simplicity, that portion of the power unit 30 which includes a temperature sensitive portion 31, a collar 32, and a guide portion 33 is referred to as the casing. Downwardly extending bracket 35 mounts the casing to the transverse wallpiece 12.

It will be noted that while the casing is mounted by bracket 35 to the transverse wallpiece 12, power member 34 is free to move. Therefore, at ambient temperatures at or above the critical temperature of the expandable material contained within the temperature sensitive portion 31 of the thermal sensitive power unit 30 power member 34 will expand in a generally downstream direction.

Poppet valve member 40 is formed with a generally discshaped portion 41 which cooperates at upwardly flared portion 41' with valve seat 15 to control the flow of fluid through the flow port. Upwardly flared portion 41' of disc 41 assures proper seating of poppet 40 upon valve seat 15. Poppet 40 also has a centrally located, upwardly extending, elongated cup-shaped portion 42 with a cap 43 thereon.

It will be noted that the exterior of cup-shaped portion 42 is slidably engaged and guided by guide portion 19 of strut 16. It will also be noted that the interior of cup-shaped portion 42 is slidably engaged with power member 34.

The compression spring 50 is mounted between concave portion 20 of strut 16 and the upper surface of poppet discshaped portion 41. The spring 50 contacts the poppet discshaped portion at 51 to bias the poppet into seated position on the valve seating surface 15 of wallpiece 12. When poppet 40 engages the valve seat 15 as shown in FIG. 1, the coolant fluid will not flow from high pressure area 11' through the flow port to low pressure area 11''.

In operation, the thermostat 10 is independently responsive to both upstream temperature and upstream pressure as will be described below.

Figure 2:
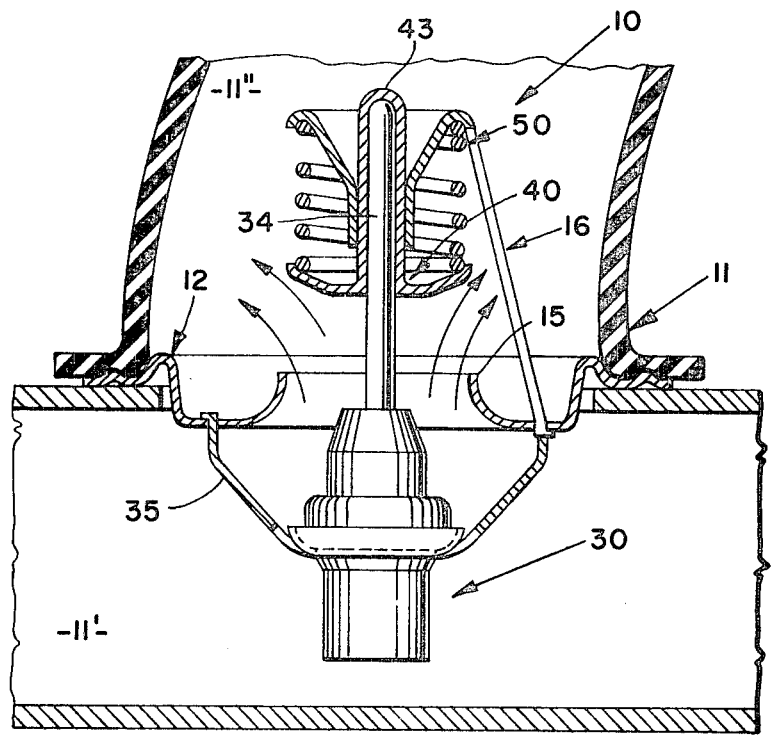
FIG. 2 is a sectional view of the thermostat illustrating the invention's thermal mode of operation.
Figure 3:
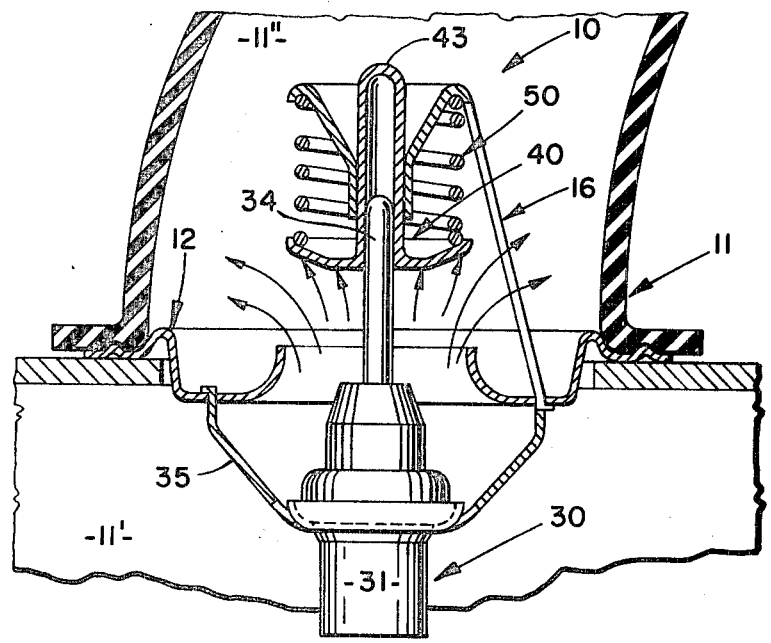
FIG. 3 is a sectional view of the thermostat illustrating the invention's pressure responsive mode of operation.

If the temperature of the coolant within the engine block is initially quite cold and it is therefore below the critical temperature of the expandable material within temperature sensitive portion 31 the power member 34 will not expand and the poppet valve 40 will remain seated on valve seat 15 thus blocking the flow of fluid through valve 10. As the temperature of the coolant rises to equal or exceed the critical temperature, power member 34 will expand upwardly engaging cap 43 of poppet valve 40, the power member will thus carry poppet valve 40 in an upward direction against the bias of spring 50 and unseat disc section 41 from valve seat 15 allowing coolant to flow through the flow port of the thermostatically controlled valve 10. The thermal mode of operation of the thermostat 10 may be seen by reference to FIG. 2. Alternately, and totally independently of the thermal mode of operation is the pressure mode of operation. If a fluid pressure rise occurs on the upstream side 11' of disc 41 which is sufficient to overcome the biasing force of spring 50 which is in turn maintaining poppet valve 40 in engagement with the valve seat 15, the poppet valve 40 will independently move upward against the biasing force thereby opening the flow port of thermostatically controlled valve 10. This is possible because poppet 40 is slidably disengageable from power member 34 in the downstream, or low pressure, direction as is indicated in FIG. 3.

It should be noted that all upward and downward movement of poppet 40 are guided by guiding section 19 of strut 16 and by power member 34. Thus, all upstream and downstream travel of poppet 40 is guided at the exterior of its cup-shaped portion 42 by the guide 19 and at the interior of its cup-shaped portion 42 by the power member 34. The relatively great length of cup-shaped portion 42 as compared to the diameter of disc 41 assures smooth operation of poppet 40 as the poppet opens and closes the flow port defined by valve seat 15. This relatively great length also reduces the possibility of the poppet being in any given position. It should also be noted that spring 50 is substantially outside of the normal flow of fluid through port 14.

As the temperature falls below the critical point and the upstream pressure falls below that pressure sufficient to overcome the biasing force of spring 50 the poppet valve is once again urged to seat on valve seat 15 closing the flow port, thereby not allowing coolant fluid to flow through thermostatically controlled valve 10.

It will be understood of course that this embodiment of my invention has been used for illustrative purposes only and that various modifications and variations in the present invention may be affected without departing from the spirit and scope of the present invention as is set forth in the following claims.

I claim:

1. A waterline thermostat poppet valve comprising:
   a transverse wallpiece having an annular valve seating surface defining a fluid flow port therethrough;
   a thermal sensitive power unit having a power member reacting to predetermined ambient temperatures by variable extension therefrom mounted to said wallpiece;
   a poppet for cooperating with said surface to control the flow of fluid through said flow port, said poppet including a centrally located generally disc-shaped portion normally engaging said valve seating surface on the low pressure side thereon and a cup-shaped portion for slidably engaging the power member, said power member slidably engaging said poppet at the interior of said cup-shaped portion for unseating motion in response to a predetermined pressure independent of power member extension; and
   spring biasing means urging said poppet into said seated position on said valve seating surface.

2. The thermostat of claim 1 wherein said wallpiece includes a strut mounted to and extending in an upstream direction therefrom, said strut having an undersurface facing in the generally downstream direction and said spring biasing means being interposed said undersurface and said poppet.

3. The thermostat of claim 2 wherein said strut has a guide means generally aligned with said cup-shaped portion, said portion of the poppet for guidingly directing the upstream and downstream movements thereof.

* * * * *